United States Patent [19]

Weidenbach et al.

[11] 4,088,607

[45] May 9, 1978

[54] CATALYST AND METHOD OF PREPARING SAME

[75] Inventors: Guenther Weidenbach, Anderten; Karl Hermann Koepernik, Hanover; Hans Brautigam, Grossburgwedel, all of Germany

[73] Assignee: Kali-Chemie Aktiengessellschaft, Hanover, Germany

[21] Appl. No.: 717,741

[22] Filed: Aug. 25, 1976

Related U.S. Application Data

[62] Division of Ser. No. 541,775, Jan. 17, 1975, Pat. No. 4,005,177.

[30] Foreign Application Priority Data

Jan. 19, 1974 Germany .............................. 2402519

[51] Int. Cl.$^2$ .......................... B01J 21/04; B01J 23/60
[52] U.S. Cl. ................................ 252/466 PT; 252/463
[58] Field of Search ................. 252/463, 475, 466 PT

[56] References Cited

U.S. PATENT DOCUMENTS

| | | | |
|---|---|---|---|
| 3,397,154 | 8/1968 | Talsma | 252/463 |
| 3,674,423 | 7/1972 | Klimisch | 423/230 |
| 3,729,520 | 4/1973 | Rutzen et al. | 252/463 X |
| 3,773,894 | 11/1973 | Bernstein et al. | 423/213.5 |
| 3,839,224 | 10/1974 | Yonehara et al. | 252/466 PT |

*Primary Examiner*—W. J. Shine
*Attorney, Agent, or Firm*—Bacon & Thomas

[57] ABSTRACT

Disclosed is an improved catalyst having a high thermal stability including a solid catalyst support having a layer of catalytically active carrier material, either as a coating on a non-catalytically active support or as particles of catalytically active carrier material, and a catalytically active metal component upon the carrier, wherein the improved aspect resides in between about 0.2 and 15% by weight of zinc in the form of zinc oxide contained in the catalytically active carrier material. Also disclosed are a method for preparing the improved catalyst and a method for utilizing the catalyst for purifying automobile exhaust gas and industrial waste gas.

17 Claims, No Drawings

CATALYST AND METHOD OF PREPARING SAME

This is a division of application Ser. No. 541,775, filed Jan. 17, 1975, now U.S. Pat. No. 4,005,177.

BACKGROUND OF THE INVENTION

The present invention relates to improved catalysts, and more especially, to a catalyst having high thermal stability, particularly a catalyst based upon ceramic and/or metal supporting elements, as well as to a process for manufacturing the catalyst and to a process for using the catalyst, in particular for the purification of industrial waste gases and automobile exhaust gases.

Loose particulate bed catalysts and also reticulated or honey-comb catalysts can be employed for the catalytic removal of harmful components from industrial waste gases and automobile exhaust gases. Both types are comprised of a carrier and catalytically active components. Reticulated, e.g., honey-comb, structures of catalytically inert material, for example, ceramic or metal, are suitably coated with a catalytically active layer of a carrier material and one or more catalytically active metals, particularly noble metals, whereas particulate catalyst bodies can be prepared in such a manner that these support bodies are formed from the catalytically active carrier material, upon which one or more catalytically active metals are then brought.

Particulate loose bed catalysts and reticulate catalysts have differing advantages; however, both types possess the same type disadvantage that they lose their activity when subjected to the high and continual thermal stress to which exhaust gas catalysts, in particular, are exposed. This effect may be traced back to a recrystallization of the catalytically active components and to their diffusion into the region of the catalyst body which lies outside of the depth of penetration of the reactants. Accordingly, there exists a definite need for particulate and reticulated catalysts which exhibit enhanced thermal stability.

SUMMARY OF THE INVENTION

It is therefore an object of the present invention to provide catalysts which exhibit an improved degree of thermal stability.

It is also an object of the present invention to provide both particulate catalysts as well as reticulated catalysts which are particularly suitable for withstanding thermal stress.

Another object of the present invention resides in the provision of catalysts suitable for the purification of industrial waste gases and automobile exhaust gases, which catalysts in addition exhibit excellent thermal stability.

Another object of the present invention resides in the provision of a process for the preparation of catalysts having excellent thermal stability, including both particulate catalysts intended for use in loose bed catalyst systems as well as reticulate catalyst systems.

It is yet another object of the present invention to provide a method for purifying industrial waste gases and automobile exhaust gases by contacting such gases with the improved catalyst provided in accordance with the invention.

In accomplishing the foregoing and other objects, there has been provided in accordance with the present invention an improved catalyst having a high thermal stability, including a solid catalyst support bearing a layer of catalytically active carrier material and a catalytically active metal component being deposited upon the carrier, and wherein the improvement comprises between about 0.2 and 15% by weight, preferably between about 0.5 and 8% by weight of zinc in the form of zinc oxide contained in the catalytically active carrier material. The solid catalyst support may be either a solid reticulated structure of catalytically inert material, such as ceramic or metal, bearing a layer of catalytically active carrier material, or alternatively the solid support may comprise a bed of discrete solid particles which are formed entirely or in part from the catalytically active carrier material. Preferably the catalytically active carrier material comprises aluminum oxide and the catalytically active metal component comprises a noble metal.

In another aspect of the present invention, there has been provided a process for the preparation of an improved catalyst having a high thermal stability, comprising the steps of mixing together a catalytically active carrier material and zinc oxide, forming a layer of the zinc oxide-containing carrier material on a solid catalyst support, drying the support at a temperature between about 100° and 250° C., calcining the dried support at a temperature between about 600 and 1200° C. and thereafter applying a catalytically active metal component to the carrier. In the case of producing a reticulated catalyst structure, the catalytically active carrier material is preferably aluminum oxide hydrate, and an aqueous suspension of highly dispersed zinc oxide and the hydrate is produced, which suspension is then coated upon a catalytically inert support member. Where the catalyst is a particulate bed catalyst system, the process involves forming discrete solid particles from the mixture of carrier material, preferably aluminum oxide, and the zinc oxide.

In a further embodiment of the present invention, there has been provided a process for purifying automobile exhaust gas and industrial waste gas, comprising contacting the gas with the improved catalyst described hereinabove at an elevated temperature sufficient to cause conversion of the undesirable components in the gas.

Other objects, features and advantages of the present invention will become apparent from the following detailed description of several preferred embodiments of the invention.

DETAILED DESCRIPTION OF PREFERRED EMBODIMENTS

In accordance with the present invention, it has quite unexpectedly been discovered that a content of between about 0.2 and 15%, preferably between about 0.5 and 8% by weight of zinc in the form of zinc oxide in the catalytically active carrier material, which preferably comprises aluminum oxide, results in a stabilizing effect which enables the activity of the catalyst to remain undiminished even after longer calcining by temperatures up to 1100° C. Thus, in the case of particulate bed catalysts, the zinc is added in the form of its oxide, in a highly dispersed condition, having a particle size in the range of from 0.5 to 5 $\mu$, preferably 1-3 $\mu$, before the pressing, granulation or other preparation method to the aluminum oxide hydrate, which may be used, for example, as the catalytically active carrier material. In the case of a reticulated catalyst body, the zinc oxide is added before the coating of the catalyst support member to the aqueous suspension which serves for the preparation of the catalytically active carrier material and which preferably contains highly dispersed aluminum oxide hydrate.

A catalyst composition consisting of aluminum oxide and zinc oxide without any other catalytically active component had been described in U.S. Pat. No. 3,674,423. The scope of this invention is to reduce nitrogen oxides in waste gases, zinc oxide being the only catalytically active component. The scope of the present invention is a high temperature and long time stable catalyst based on a carrier material consisting of aluminum oxide and zinc oxide, and supported thereon, active metal components. In the unused, virgin state, as may be seen from the examples 17-19 and tables 1-3, there is no difference of catalytic activity in the catalysts compounded with or without zinc oxide.

A further difference of the U.S. Pat. No. 3,674,423 and the present invention is the method of preparing the catalysts. According to the USP the aluminum oxide is impregnated with zinc nitrate and then heated to 550° C. This method produces a nearly molecular dispersion of the zinc oxide. According to the present invention the zinc oxide is added as a fine powder of e.g. 1 to 3 $\mu$.

The catalyst in accordance with the present invention can, for example, be produced in accordance with the following process:

If the catalyst is to be prepared as a particulate bed catalyst, then aluminum oxide, preferably pseudoboehmite, is mixed with from about 0.2 to 15%, preferably from about 0.5 to 8% by weight of zinc in the form of its oxide in highly dispersed condition. Optionally, conventional additives such as water, acids, porosity agents and/or lubricants may be added where desired. Then the mixture is granulated, extruded or tabletized, as desired, the resulting particles dried and finally calcined under conditions of conventional temperature increase between 700° and 1200° C, preferably between about 900° and 1100° C. The final step involves impregnating the catalyst carrier with one or more catalytically active metals. Pseudoboehmite is a poorly crystallized aluminum oxide hydroxide (see I. W. Newsome Alumina Properties, Technical Paper No. 10, Aluminum Company of America, 1960).

If the carrier is to be employed in the form of ceramic reticulated structures, such as honey-comb structures, then the coating of the catalyst support, e.g., formed of cordierite, spodumen, corundum for mixtures of these materials, is carried out with an aqueous suspension which contains between about 5 and 25%, preferably between about 8 and 15% by weight of highly dispersed aluminum hydroxide, having a particle size in the range from 0.5-5 $\mu$, preferably 1-3 $\mu$ and between about 0.01 and 3% preferably between about 0.25 and 1.5% zinc in the form of its oxide, having a particle size in the range from 0.5-5 $\mu$, preferably 1-3 $\mu$. The aluminum hydroxide is preferably present as pseudoboehmite. Subsequently, the reticulated structure is dried at a temperature of between about 100° and 250° C, preferably at approximately 200° C, and is thereafter calcined at a temperature between about 600° and 1200° C, preferably between about 800° and 1000° C. Finally, the catalyst support bearing the layer of catalyst carrier is impregnated with one or more catalytically active metals.

If, on the other hand, the carrier is to be employed in the form of metallic reticulated structures, then the catalyst support member of a non-rusting, scale-free and heat resistant metallic material is first coated with an elastic priming layer of aluminum silicate, preferably in the form of aluminum silicate fibers. The thickness of the primer layer is typically between about 5 and 100 $\mu$, and more preferably between about 10 and 50 $\mu$. After coating the metallic skeleton with the primer layer and after drying at a temperature between about 100° and 250° C, preferably at approximately 200° C, the primed skeleton is coated with a layer of catalytically active carrier material. This involves the step of coating with an aqueous suspension which contains highly dispersed aluminum hydroxide (e.g., particle size in the range from 1-3 $\mu$, which is preferably present as pseudoboehmite and between about 0.01 and 3%, preferably between about 0.25 and 1.5% by weight of zinc in the form of its oxide in a highly dispersed condition (e.g., particle size in the range from 1 to 3 $\mu$. The thickness of this coating ranges between about 2 and 50 $\mu$ and preferably between 5 and 15 $\mu$ and preferably between about 5 and 15 $\mu$. Subsequently, the reticulated metal body is dried at a temperature between about 100° and 250° C, preferably about 200° C, and is calcined at a temperature between about 600° and 1000° C, preferably between about 800° and 1000° C. Finally, the dried and calcined catalyst support is impregnated with one or more catalytically active metals.

For waste gas and/or exhaust gas catalyst, there may be employed as catalytically active metals, for example, between about 0.01 and 1%, preferably between about 0.02 and 0.5% by weight of platinum and/or palladium, whereby mixtures of the two metals preferably contain a platinum:palladium ratio of between about 9:5 and 4:3 by weight. Furthermore, there may be employed up to about 0.5% by weight each of ruthenium and platinum, whereby the ratio of ruthenium to platinum ranges between about 1:3 and 1:0.15. Alternatively there may be employed up to about 0.5% by weight platinum in combination with ruthenium, rhodium and rhenium, and in this case the ratio of platinum to ruthenium to rhodium to rhenium ranges between about 1:1:1:1 and 1:0.25:0.25:0.25.

In the case of reticulated catalyst structures, the noble metal components can also be applied simultaneously with the catalytically active carrier material comprising aluminum oxides and zinc oxide. Similarly, in the case of particulate catalyst beds or the like, the noble metal components can be mixed into the aluminum hydroxide-zinc oxide mixture prior to formation of the carrier structure.

Of the catalysts described hereinabove, the type which contains only platinum and/or palladium is particularly suitable for the oxidation of carbon monoxide and uncombusted hydrocarbons in automobile exhaust gases and industrial waste gases. The ruthenium- and platinum-catalyst types are especially suitable for the reduction of nitrogen oxides in the aforementioned waste and exhaust gases. On the other hand, for the simultaneous conversion of carbon monoxide, uncombusted hydrocarbons and nitrogen oxides in automobile exhaust gases, which result in the case of nearly stoichiometric adjustment and maintenance of the fuel-air ratio in the automobile engine, there has been found particularly suitable, for example, the catalyst type which contains platinum, ruthenium, rhodium, and rhenium (a single bed catalyst process). The operating temperature range of the catalysts is in the range of the automobile exhaust gases, namely 200° to 1000° C.

The following Examples are presented to more fully explain the manufacture and application of the catalyst in accordance with the present invention, being understood that the examples are intended as merely illustrative and in no sense limitative.

EXAMPLE 1

An aluminum hydroxide which consists essentially of pseudoboehmite with portions of a morphous hydroxide is dried, ground up and mixed with 3% by weight of zinc oxide which has a particle size of less than 3 μ. Granulation of the mixture is accomplished in accordance with the process described in German Offenlegungsschrift No. 2,308,890, the disclosure of which is incorporated herein by reference. According to this process, the aluminum oxide is treated with between 30 and 60 weight percent of a 0.1 to 2% ammonia solution prior to being formed into granules and dried, and preferably also has added thereto between 0.01 and 1% by weight of carbon black. The granulated material is calcined in a rotating drum under conditions of conventional temperature increse for 15 minutes between 1030° and 1050° C, and after cooling is impregnated with a solution at its boiling temperature which contains an amount of platinum tetramine hydroxide and palladium tetrammine hydroxide which is sufficient to produce a finished catalyst No. 1 containing 0.045% by weight platinum and 0.017% by weight palladium after drying at 120° C and calcining at 800° C.

EXAMPLE 2

The carrier described in Example 1 is treated with a platinum tetrammine hydroxide solution at its boiling temperature which contains an amount of platinum sufficient to provide a finished catalyst No. 2 containing 0.1% by weight platinum after drying at 120° C and calcining at 800° C.

EXAMPLE 3

The carrier described in Example 1 is treated with a mixed solution of platinum tetrammine hydroxide and ruthenium tetrammine-hydroxy-chloro-hydroxide at its boiling temperature which contains an amount of platinum and ruthenium which is sufficient to provide the finished catalyst No. 3 with 0.15% by weight platinum and 0.075% by weight ruthenium after drying at 120° C and calcining at 800° C.

EXAMPLE 4

The carrier described in Example 1 is treated first with a mixed solution of platinum tetrammine hydroxide and ruthenium tetrammine-hydroxy-chloro-hydroxide at its boiling temperature which contains an amount of platinum and ruthenium sufficient to provide the catalyst with 0.05% by weight platinum and 0.05% by weight ruthenium after drying at 120° C. and calcining at 800° C. In the second step, the catalyst is impregnated with a solution of rhodium-III-nitrate and ammonium perrhenate at its boiling temperature which contains an amount of rhodium and rhenium sufficient to provide the catalyst after drying at 120° C. and calcining at 800° C. with 0.05% by weight each of rhodium and rhenium. After reduction in a stream of hydrogen at a temperature of 500° C., the final catalyst No. 4 contains 0.05% by weight each of platinum, ruthenium, rhodium and rhenium.

EXAMPLE 5

A honey-comb shaped support structure manufactured from a 50 μ thick steel sheet of non-rusting, scale-free and thermally stable steel material is dipped in a degreased and clean condition into an aqueous suspension which contains fibrous aluminum silicate and colloidal silicic acid. A commercially available product marketed under the designation "Fiberfrax QF 180" by the Carborundum Company is employed as the aluminum silicate. After drying at 200° C., the catalyst body is dipped in a suspension which contains 10% by weight of highly dispersed pseudoboehmite (particle size less than 3 μ) and 0.62% by weight of highly dispersed zinc oxide (particle size less than 3 μ) in water. After drying at 200° C. and calcining at 900° C., the catalyst support is treated with a solution at its boiling temperature which contains an amount of platinum tetrammine hydroxide and palladium tetrammine hydroxide which is sufficient to provide the finished catalyst No. 5 with 0.18% by weight platinum and 0.1% by weight palladium after drying at 120° C. and calcining at 800° C.

EXAMPLE 6

The carrier described in Example 5 which is coated with aluminum silicate, aluminum hydroxide and zinc oxide is treated with a platinum tetrammine hydroxide solution at its boiling temperature which contains an amount of platinum sufficient to provide a finished catalyst No. 6 with 0.18% by weight platinum after drying at 120° C. and calcining at 800° C.

EXAMPLE 7

The carrier described in Example 5 which is coated with aluminum silicate, aluminum oxide and zinc oxide is treated with a mixed solution of platinum tetrammine hydroxide and ruthenium tetrammine-hydroxy-chloro-hydroxide at its boiling temperature which contains an amount of platinum and ruthenium which is sufficient to provide the finished catalyst No. 7 with 0.15% by weight platinum and 0.075% by weight ruthenium after drying at 120° C. and calcining at 800° C.

EXAMPLE 8

The carrier described in Example 5 which is coated with aluminum silicate, aluminum hydroxide and zinc oxide is treated first with a mixed solution of platinum tetrammine hydroxide and ruthenium tetrammine-hydroxy-chloro-hydroxide at its boiling temperature which contains an amount of platinum and ruthenium sufficient to provide the catalyst with 0.05% by weight platinum and 0.05% by weight ruthenium after drying at 120° C. and calcining at 800° C. In the second step, the catalyst is impregnated with a solution of rhodium-III-nitrate and ammonium perrhenate which contains an amount of rhodium and rhenium sufficient to provide a content of 0.05% by weight each of rhodium and rhenium based upon the catalyst which is dried at 120° C. and calcined at 800° C. After reduction in a stream of hydrogen at a temperature of 500° C., the finished catalyst No. 8 contains 0.05% by weight each of platinum, ruthenium, rhodium and rhenium.

EXAMPLE 9

A ceramic honey-comb structure of a cordierite composition is put in a suspension which consists of 10% by weight of highly dispersed pseudoboehmite (particle size less than 3 μ) and 0.62% by weight of highly dispersed zinc oxide (particle size less than 3 μ) in water. After drying a 200° C. and calcining at 900° C. the catalyst support body is treated with a solution at its boiling temperature which contains an amount of platinum tetrammine hydroxide and palladium tetrammine hydroxide which is sufficient to provide the finished catalyst No. 9 with a content of 0.12% by weight platinum and 0.065% by weight palladium after drying at 120° C. and calcining at 800° C.

EXAMPLE 10

The carrier described in Example 9 which is coated with aluminum oxide and zinc oxide is treated with a platinum tetrammine hydroxide solution at its boiling temperature which contains an amount of platinum sufficient to provide the finished catalyst No. 10 with a content of 0.12% by weight platinum after drying at 120° C. and calcining at 800° C.

EXAMPLE 11

The carrier described in Example 9 which is coated with aluminum oxide and zinc oxide is treated with a mixed solution of platinum tetrammine hydroxide and ruthenium tetrammine-hydroxy-chloro-hydroxide at its boiling temperature which contains an amount of platinum and ruthenium sufficient to provide the finished catalyst No. 11 with a content of 0.1% by weight platinum and 0.05% by weight ruthenium after drying at 120° C. and calcining at 800° C.

EXAMPLE 12

The carrier described in Example 9 which is coated with aluminum oxide and zinc oxide is treated first with a mixed solution of platinum tetrammine hydroxide and ruthenium tetrammine-hydroxy-chloro-hydroxide at its boiling temperature which contains an amount of platinum and ruthenium sufficient to provide the catalyst, after drying at 120° C. and calcining at 800° C., with a content of 0.033% by weight platinum and 0.033% by weight ruthenium. In the second step, the catalyst is impregnated with a solution of rhodium-III-nitrate and ammonium perrhenate which contains an amount of rhodium and rhenium so that the content of rhodium and rhenium based upon the catalyst dried at 120° C. and calcined at 800° C. amounts to 0.033% by weight for each. After reduction of the catalyst of the catalyst in a hydrogen stream at 500° C., the finished catalyst No. 12 contains 0.033% by weight each of platinum, ruthenium, rhodium and rhenium.

EXAMPLE 13 (COMPARATIVE)

In order to provide proof that a catalyst having a carrier of aluminum oxide which does not contain the addition of zinc in accordance with the present invention possesses an essentially lower resistance to thermal aging, a honey-comb support structure prepared from a 50 μ thick sheet of a non-rusting, scale-free and heat resistant steel material is dipped in a defatted and cleaned condition into a suspension which is comprised of fibrous aluminum silicate in aqueous colloidal silicic acid. A commercially available product available under the designation "Fiberfrax QF 180" from the Carborundum Company is employed as the aluminum silicate. After drying at 200° C. the catalyst body is dipped in a suspension which is comprised of 10% by weight of highly dispersed pseudoboehmite (particle size 3 μ) in water. After drying at 200° C. and calcining at 900° C., the catalyst body is treated with a solution at its boiling temperature which contains an amount of platinum tetrammine hydroxide and palladium tetrammine hydroxide sufficient to provide the present catalyst No. 13 with a content of 0.18% by weight platinum and 0.1% by weight palladium after drying at 120° C. and calcining at 800° C.

EXAMPLE 14 (COMPARATIVE)

The carrier described in Example 13 which is treated with aluminum silicate and aluminum oxide is treated with a platinum tetrammine hydroxide solution at its boiling temperature which contains an amount of platinum sufficient to provide the finished catalyst No. 14, after drying at 120° C. and calcining at 800° C. with a content of 0.18% by weight of platinum.

EXAMPLE 15 (COMPARATIVE)

The carrier described in Example 13 which is coated with aluminum silicate and aluminum oxide is treated with a mixed solution of platinum tetrammine hydroxide and ruthenium tetrammine-hydroxy-chloro-hydroxide at its boiling temperature which contains an amount of platinum and ruthenium sufficient to provide the catalyst No. 15 with a content of 0.15% by weight platinum and 0.075% by weight ruthenium after drying at 120° C. and calcining at 800° C.

EXAMPLE 16 (COMPARATIVE)

The carrier described in Example 13 which is coated with aluminum silicate and aluminum oxide is treated with a mixed solution of platinum tetrammine hydroxide and ruthenium tetrammine-hydroxo-chloro-hydroxide at the boiling temperature which contains an amount of platinum and ruthenium sufficient to provide the catalyst after drying at 120° C. and calcining at 800° C., with a content of 0.05% by weight platinum and 0.05% by weight ruthenium. In the second step, the catalyst is impregnated with a solution of rhodium-III-nitrate and ammonium perrhenate which contains an amount of rhodium and rhenium sufficient to provide a metal content based upon the catalyst dried at 120° C. and calcined at 800° C. of 0.05% by weight each of rhodium and rhenium. After reduction of the catalyst in a hydrogen stream of 500° C., the finished catalyst No. 16 contains 0.05% by weight each of platinum, ruthenium, rhodium and rhenium.

EXAMPLE 17

In order to test the oxidation activity, the catalysts 1, 2, 5, 6, 9, 10, 13 and 14 are tested with a gas mixture containing:

| | |
|---|---|
| 300 ppm | Ethylene |
| 1 Vol.-% | Carbon monoxide |
| 10 Vol.-% | Carbon dioxide |
| 10 Vol.-% | Water vapor |
| 3 Vol.-% | Oxygen |
| Rest | Nitrogen |

The space velocity is 40,000 hr.$^{-1}$. The residual content of CO and ethylene is determined after exit from the catalyst bed with Uras(CO) and FID(ethylene) under conditions of stepwise increased gas entrance temperature, whereby the measurement is accomplished in a nearly adiabatic reactor after accomplishment of temperature equilibrium. From the curve plotted from the data points obtained, there is calculated by graphical interpolation the temperature at which 50% of the CO and 50% of the ethylene is converted.

This half-value temperature ($T_{50}$) serves as an indication of activity. After testing the catalyst in fresh condition under the above recited conditions, the catalysts are then aged in air at 24 hours respectively, at 870° C., 980° C. and partially at 1090° C. After each aging step a new activity test is carried out. The results are set forth in Table 1.

TABLE I

| CATALYST No. | AGING | CO-CONVERSION 50% | $C_2H_4$-CONVERSION 50% |
|---|---|---|---|
| 1 | fresh | 208 | 208 |
|   | 24 hr. 870° C. | 217 | 220 |
|   | 24 hr. 980° C. | 234 | 240 |
|   | 24 hr. 1090° C. | 251 | 259 |
| 2 | fresh | 237 | 240 |
|   | 24 hr. 870° C. | 258 | 261 |
|   | 24 hr. 980° C. | 281 | 286 |
|   | 24 hr. 1090° C. | 298 | 302 |
| 5 | fresh | 221 | 228 |
|   | 24 hr. 870° C. | 230 | 245 |
|   | 24 hr. 980° C. | 249 | 261 |
| 6 | fresh | 252 | 253 |
|   | 24 hr. 870° C. | 265 | 268 |
|   | 24 hr. 980° C. | 286 | 293 |
| 9 | fresh | 188 | 186 |
|   | 24 hr. 870° C. | 201 | 208 |
|   | 24 hr. 980° C. | 221 | 225 |
|   | 24 hr. 1090° C. | 253 | 264 |
| 10 | fresh | 268 | 272 |
|   | 24 hr. 870° C. | 280 | 288 |
|   | 24 hr. 980° C. | 291 | 297 |
|   | 24 hr. 1090° C. | 307 | 312 |
| 13 | fresh | 227 | 226 |
|   | 24 hr. 870° C. | 254 | 273 |
|   | 24 hr. 980° C. | 292 | not accomplished |
| 14 | fresh | 252 | 252 |
|   | 24 hr. 870° C. | 316 | 328 |
|   | 24 hr. 980° C. | 371 | not accomplished |

EXAMPLE 18

For the purpose of examining the reduction activity, the catalysts 3, 7, 11 and 15 are tested with a gas mixture containing:

| 0.1 | Vol.-% NO |
| 4 | Vol.-% CO |
| 0.5 | Vol.-% $H_2$ |
| 10 | Vol.-% $CO_2$ |
| 14 | Vol.-% $H_2O$-Vapor |
| 0–2.3 | Vol.-% $O_2$ |
| Rest | $N_2$ |

The testing is carried out with a variable oxygen content between 0 and 2.3% by volume and at a space velocity of 50,000 hr.$^{-1}$ and with a gas entrance temperature of 500° C.

The conversion value of NO as well as the ammonia produced are calculated in accordance with the formula:

$$L = \frac{(O_2) + 0.5\,(NO)}{0.5\,(CO) + 0.5\,(H_2)}$$

If one sets L=1, then the oxidizing and reducing reaction participants stand in stoichiometric relationship. The activity of the catalyst is evaluated in accordance with the NO-conversion and the $NH_3$-formation in the region of L=0–1, whereby the goal is a complete conversion of the NO and a very small $NH_3$-formation.

After testing in the fresh condition under the indicated conditions, the catalysts are aged in air for 24 hrs. respectively at 870° C., 980° C., and partially at 1090° C. After each aging step, a new activity test is carried out. The results are set forth in Table 2.

TABLE 2

| Aging | Temp. ° C. | Space vel. hr.$^{-1}$ | L | Cat.-No. 3 NO-Conv. % | $NH_3$ formation ppm | Cat.-No. 7 NO-Conv. % | $NH_3$ formation ppm | Cat.-No. 11 NO-Conv. % | $NH_3$ formation ppm | Cat.-No. 15 NO-Conv. % | $NH_3$ formation ppm |
|---|---|---|---|---|---|---|---|---|---|---|---|
| Fresh | 500 | 50000 | 0.02 | 100 | 55 | 100 | 100 | 100 | 100 | 100 | 70 |
|   |   |   | 0.07 | 100 | 65 | 100 | 90 | 100 | 100 | 100 | 100 |
|   |   |   | 0.11 | 100 | 50 | 100 | 80 | 100 | 100 | 100 | 80 |
|   |   |   | 0.16 | 100 | 45 | 100 | 70 | 100 | 70 | 100 | 70 |
|   |   |   | 0.24 | 100 | 10 | 100 | 70 | 100 | 50 | 100 | 45 |
|   |   |   | 0.33 | 100 | 7 | 100 | 45 | 100 | 40 | 100 | 25 |
|   |   |   | 0.49 | 100 | 5 | 100 | 20 | 100 | 20 | 100 | 10 |
|   |   |   | 0.82 | 100 | 3 | 100 | 10 | 100 | 20 | 100 | 10 |
|   |   |   | 0.87 | 100 | 0 | 100 | 10 | 100 | 10 | 100 | 10 |
|   |   |   | 0.91 | 100 | 0 | 100 | 10 | 100 | 10 | 100 | 3 |
|   |   |   | 0.96 | 100 | 0 | 100 | 5 | 100 | 5 | 100 | 3 |
|   |   |   | 1.00 | 100 | 0 | 100 | 2 | 100 | 5 | 100 | 3 |
|   |   |   | 1.05 | 30 | — | 34 | — | 50 | — | 54 | — |
| 24 hr. | 870 |   | 0.02 | 100 | 60 | 100 | 100 | 100 | 40 | 100 | 70 |
|   |   |   | 0.07 | 100 | 70 | 100 | 100 | 100 | 50 | 100 | 120 |
|   |   |   | 0.11 | 100 | 65 | 100 | 80 | 100 | 65 | 100 | 100 |
|   |   |   | 0.16 | 100 | 55 | 100 | 70 | 100 | 60 | 100 | 80 |
|   |   |   | 0.24 | 100 | 30 | 100 | 60 | 100 | 55 | 100 | 50 |
|   |   |   | 0.33 | 100 | 15 | 100 | 55 | 100 | 35 | 100 | 40 |
|   |   |   | 0.49 | 100 | 8 | 100 | 50 | 100 | 25 | 100 | 15 |
|   |   |   | 0.82 | 100 | 3 | 100 | 10 | 100 | 15 | 100 | 5 |
|   |   |   | 0.87 | 100 | 1 | 100 | 10 | 100 | 15 | 100 | 5 |
|   |   |   | 0.91 | 100 | 0 | 100 | 10 | 100 | 15 | 100 | 3 |
|   |   |   | 0.96 | 100 | 0 | 100 | 5 | 100 | 15 | 100 | 2 |
|   |   |   | 1.00 | 100 | 0 | 100 | 5 | 100 | 5 | 100 | 2 |
|   |   |   | 1.05 | 30 | — | 39 | — | 38 | — | 60 | — |
| 24 hr. | 980 |   | 0.02 | 100 | 35 | 100 | 70 | 100 | 40 | 50 | 35 |
|   |   |   | 0.07 | 100 | 30 | 100 | 80 | 100 | 45 | 79 | 55 |
|   |   |   | 0.11 | 100 | 30 | 100 | 60 | 100 | 30 | 72 | 35 |
|   |   |   | 0.16 | 100 | 25 | 100 | 50 | 100 | 25 | 68 | 25 |
|   |   |   | 0.24 | 100 | 18 | 100 | 25 | 100 | 20 | 59 | 15 |
|   |   |   | 0.33 | 100 | 12 | 100 | 10 | 100 | 12 | 53 | 8 |
|   |   |   | 0.49 | 100 | 5 | 100 | 5 | 100 | 10 | 43 | 5 |
|   |   |   | 0.82 | 100 | 3 | 100 | 3 | 100 | 7 | 33 | 5 |
|   |   |   | 0.87 | 100 | 0 | 100 | 3 | 100 | 5 | 30 | 4 |
|   |   |   | 0.91 | 100 | 0 | 100 | 3 | 100 | 5 | 25 | 4 |
|   |   |   | 0.96 | 97 | 0 | 100 | 3 | 100 | 5 | 18 | 4 |
|   |   |   | 1.00 | 96 | 0 | 99 | 3 | 100 | 3 | 16 | 4 |
|   |   |   | 1.05 | 15 | — | 35 | — | 30 | — | 14 | — |

TABLE 2-continued

| Aging | Temp. °C. | Space vel. hr.$^{-1}$ | L | Cat.-No. 3 NO-Conv. % | NH$_3$ formation ppm | Cat.-No. 7 NO-Conv. % | NH$_3$ formation ppm | Cat.-No. 11 NO-Conv. % | NH$_3$ formation ppm | Cat.-No. 15 NO-Conv. % | NH$_3$ formation ppm |
|---|---|---|---|---|---|---|---|---|---|---|---|
| 24 hr. | 1090 | | 0.02 | 96 | 70 | | | 94 | 30 | | |
| | | | 0.07 | 97 | 100 | | | 95 | 65 | | |
| | | | 0.11 | 97 | 100 | | | 97 | 60 | | |
| | | | 0.16 | 98 | 90 | | | 98 | 50 | | |
| | | | 0.24 | 98 | 90 | | | 99 | 38 | | |
| | | | 0.33 | 98 | 90 | | | 99 | 25 | | |
| | | | 0.49 | 99 | 65 | | | 99 | 20 | | |
| | | | 0.82 | 99 | 60 | | | 99 | 15 | | |
| | | | 0.87 | 99 | 60 | | | 99 | 15 | | |
| | | | 0.91 | 97 | 50 | | | 99 | 15 | | |
| | | | 0.96 | 96 | 30 | | | 98 | 10 | | |
| | | | 1.00 | 94 | 20 | | | 97 | 7 | | |
| | | | 1.05 | 0 | — | | | 0 | — | | |

EXAMPLE 19

To examine the activity for the simultaneous conversion of hydrocarbons, carbon monoxide and nitrogen oxides, the catalysts 4, 8, 12 and 16 are tested with a gas mixture which approximates in its composition an automobile exhaust gas which results by a stoichiometrically adjusted air-fuel ratio in the engine. The gas mixture contains:

| 0.1 | Vol.-% NO |
| 0.5 | Vol.-% C$_2$H$_4$ |
| 1 | Vol.-% CO |
| 0.4 | Vol.-% H$_2$ |
| 10 | Vol.-% CO$_2$ |
| 14 | Vol.-% Water Vapor |
| 0.45–0.90 | Vol.-% O$_2$ |
| Rest | N$_2$ |

The oxygen content is varied between 0.45 and 0.9% by volume. The space velocity is 50,000 hrs.$^{-1}$ at a gas entrance temperature of 500° C. If one sets the stoichiometric ratio of the oxidizing and reducing reaction participants equal to 1, than there results the relationship:

$$L = \frac{(O_2) + 0.5\,(NO)}{0.5\,(CO) + 0.5\,(H_2) + 3\,(C_2H_4)} = 1.$$

The effectiveness of the catalyst under variable L-values in the region of L−1 stoichiometric exhaust gas composition) is determined in the following way: the degree of conversion of NO, Co and C$_2$H$_4$ in percent are graphically plotted against the values of L. The region of L within which the degree of conversion of the three above-mentioned exhaust gas components lies above 90% is the criterion for the catalyst effectiveness and should be as large as possible.

After testing in the fresh condition under the conditions set forth above, the catalysts are aged in air for 24 hrs. respectively at 870° C., 980° C. and partially at 1090° C. After each aging step, a new activity test is carried out. The results are set forth in Table 3.

The results show that catalysts which are thermally exceptionally stable are obtained with the use of the carrier composition according to the present invention, irrespective of the noble metal composition and the testing procedure applied. In contrast, it is clear from the results in connection with the catalyst produced according to examples 13–16, wherein the active carrier substance does not contain zinc, that the effectiveness after 24 hrs. of aging at 980° C. is nearly completely lost (see Tables 1, 2 and 3).

Because the honey-comb structure utilized as the Example for a metallic support is constructed of a material having a tinder resistance value near 1000° C., the last aging step at 1090° C. is omitted in this instance.

TABLE 3

| | | | | Catalyst No. 4 | | | |
|---|---|---|---|---|---|---|---|
| Aging | Temp °C. | Space vel. hr.$^{-1}$ | L | NO-Conv. % | CO-Conv. % | HC-Conv. % | ΔL |
| fresh | 500 | 50000 | 0.63 | 100 | 81 | 95 | 0.26 |
| | | | 0.86 | 100 | 90 | 96 | |
| | | | 0.89 | 100 | 98 | 97 | |
| | | | 0.95 | 100 | 99 | 98 | |
| | | | 1.01 | 92 | 100 | 99 | |
| | | | 1.08 | 76 | 100 | 100 | |
| | | | 1.14 | 60 | 100 | 100 | |
| | | | 1.20 | 40 | 100 | 100 | |
| 24 hr. | 870 | | 0.63 | 100 | 77 | 96 | 0.25 |
| | | | 0.76 | 100 | 89 | 96 | |
| | | | 0.89 | 100 | 97 | 97 | |
| | | | 0.95 | 99 | 99 | 99 | |
| | | | 1.01 | 92 | 100 | 100 | |
| | | | 1.08 | 72 | 100 | 100 | |
| | | | 1.14 | 54 | 100 | 100 | |
| | | | 1.20 | 38 | 100 | 100 | |
| 24 hr. | 980 | | 0.63 | 100 | 73 | 87 | 0.21 |
| | | | 0.76 | 100 | 87 | 90 | |
| | | | 0.89 | 100 | 96 | 93 | |
| | | | 0.95 | 98 | 99 | 97 | |
| | | | 1.01 | 90 | 100 | 99 | |
| | | | 1.08 | 64 | 100 | 99 | |
| | | | 1.14 | 30 | 100 | 99 | |
| | | | 1.20 | 12 | 100 | 99 | |
| 24 hr. | 1090 | | 0.63 | 100 | 65 | 84 | 0.20 |
| | | | 0.76 | 100 | 83 | 91 | |
| | | | 0.89 | 100 | 97 | 92 | |
| | | | 0.95 | 99 | 100 | 94 | |
| | | | 1.01 | 90 | 100 | 94 | |
| | | | 1.08 | 67 | 100 | 95 | |
| | | | 1.14 | 41 | 100 | 95 | |
| | | | 1.20 | 16 | 100 | 95 | |
| | | | | Catalyst No. 8 | | | |
| Aging | Temp. °C. | Space vel. hr.$^{-1}$ | L | NO-Conv. % | CO-Conv. % | HC-Conv. % | ΔL |
| fresh | 500 | 50000 | 0.63 | 100 | 87 | 95 | 0.32 |
| | | | 0.76 | 100 | 92 | 97 | |
| | | | 0.89 | 100 | 95 | 99 | |
| | | | 0.95 | 100 | 97 | 100 | |
| | | | 1.01 | 95 | 100 | 100 | |
| | | | 1.08 | 70 | 100 | 100 | |
| | | | 1.14 | 55 | 100 | 100 | |
| | | | 1.20 | 45 | 100 | 100 | |
| 24 hr. | 870 | | 0.63 | 100 | 88 | 93 | 0.30 |
| | | | 0.76 | 100 | 93 | 94 | |
| | | | 0.89 | 100 | 95 | 96 | |
| | | | 0.95 | 100 | 97 | 99 | |
| | | | 1.01 | 85 | 100 | 99 | |
| | | | 1.08 | 57 | 100 | 100 | |
| | | | 1.14 | 47 | 100 | 100 | |
| | | | 1.20 | 39 | 100 | 100 | |
| 24 hr. | 980 | | 0.63 | 100 | 86 | 85 | 0.27 |
| | | | 0.76 | 100 | 92 | 90 | |
| | | | 0.89 | 100 | 94 | 91 | |
| | | | 0.95 | 100 | 97 | 93 | |
| | | | 1.01 | 70 | 98 | 94 | |
| | | | 1.08 | 35 | 100 | 99 | |
| | | | 1.14 | 25 | 100 | 99 | |
| | | | 1.20 | 19 | 100 | 99 | |
| 24 hr. | 1090 | | 0.63 | | | | |
| | | | 0.76 | | | | |
| | | | 0.89 | | | | |

TABLE 3-continued

|  |  |  | 0.95 |  |  |  |  |
|---|---|---|---|---|---|---|---|
|  |  |  | 1.01 |  |  |  |  |
|  |  |  | 1.08 |  |  |  |  |
|  |  |  | 1.14 |  |  |  |  |
|  |  |  | 1.20 |  |  |  |  |

Catalyst No. 12

| Ag-ing | Temp. °C. | Space vel. hr.$^{-1}$ | L | NO-Conv. % | CO-Conv. % | HC-Conv. % | ΔL |
|---|---|---|---|---|---|---|---|
| fresh | 500 | 50000 | 0.63 | 100 | 85 | 96 | 0.28 |
|  |  |  | 0.76 | 100 | 91 | 96 |  |
|  |  |  | 0.89 | 100 | 94 | 97 |  |
|  |  |  | 0.95 | 100 | 96 | 99 |  |
|  |  |  | 1.01 | 97 | 98 | 100 |  |
|  |  |  | 1.08 | 73 | 100 | 100 |  |
|  |  |  | 1.14 | 58 | 100 | 100 |  |
|  |  |  | 1.20 | 41 | 100 | 100 |  |
| 24 hr. | 870 |  | 0.63 | 100 | 84 | 92 | 0.27 |
|  |  |  | 0.76 | 100 | 92 | 95 |  |
|  |  |  | 0.89 | 100 | 97 | 97 |  |
|  |  |  | 0.95 | 100 | 99 | 100 |  |
|  |  |  | 1.01 | 82 | 100 | 100 |  |
|  |  |  | 1.08 | 63 | 100 | 100 |  |
|  |  |  | 1.14 | 47 | 100 | 100 |  |
|  |  |  | 1.20 | 34 | 100 | 100 |  |
| 24 hr. | 980 |  | 0.63 | 100 | 82 | 90 | 0.22 |
|  |  |  | 0.76 | 100 | 88 | 91 |  |
|  |  |  | 0.89 | 100 | 95 | 93 |  |
|  |  |  | 0.95 | 100 | 98 | 93 |  |
|  |  |  | 1.01 | 92 | 100 | 95 |  |
|  |  |  | 1.08 | 70 | 100 | 97 |  |
|  |  |  | 1.14 | 51 | 100 | 97 |  |
|  |  |  | 1.20 | 40 | 100 | 97 |  |
| 24 hr. | 1090 |  | 0.63 | 100 | 76 | 85 | 0.21 |
|  |  |  | 0.76 | 100 | 89 | 90 |  |
|  |  |  | 0.89 | 100 | 96 | 92 |  |
|  |  |  | 0.95 | 100 | 98 | 93 |  |
|  |  |  | 1.01 | 82 | 99 | 94 |  |
|  |  |  | 1.08 | 61 | 100 | 95 |  |
|  |  |  | 1.14 | 50 | 100 | 95 |  |
|  |  |  | 1.20 | 35 | 100 | 95 |  |

Catalyst No. 16

| Ag-ing | Temp. °C. | Space vel. Hr.$^{-1}$ | L | NO-Conv. % | CO-Conv. % | HC-Conv. % | ΔL |
|---|---|---|---|---|---|---|---|
| fresh | 500 | 50000 | 0.63 | 100 | 86 | 94 | 0.33 |
|  |  |  | 0.76 | 100 | 92 | 96 |  |
|  |  |  | 0.89 | 100 | 98 | 98 |  |
|  |  |  | 0.95 | 100 | 100 | 99 |  |
|  |  |  | 1.01 | 92 | 100 | 100 |  |
|  |  |  | 1.08 | 79 | 100 | 100 |  |
|  |  |  | 1.14 | 60 | 100 | 100 |  |
|  |  |  | 1.20 | 41 | 100 | 100 |  |
| 24 hr. | 870 |  | 0.63 | 100 | 83 | 93 | 0.33 |
|  |  |  | 0.76 | 100 | 92 | 95 |  |
|  |  |  | 0.89 | 100 | 98 | 97 |  |
|  |  |  | 0.95 | 98 | 100 | 98 |  |
|  |  |  | 1.01 | 94 | 100 | 99 |  |
|  |  |  | 1.08 | 83 | 100 | 100 |  |
|  |  |  | 1.14 | 66 | 100 | 100 |  |
|  |  |  | 1.20 | 44 | 100 | 100 |  |
| 24 hr. | 890 |  | 0.63 | 98 | 40 | 60 | 0.00 |
|  |  |  | 0.76 | 98 | 61 | 70 |  |
|  |  |  | 0.89 | 88 | 73 | 78 |  |
|  |  |  | 0.95 | 83 | 80 | 81 |  |
|  |  |  | 1.01 | 76 | 84 | 83 |  |
|  |  |  | 1.08 | 64 | 87 | 84 |  |
|  |  |  | 1.14 | 56 | 88 | 85 |  |
|  |  |  | 1.20 | 50 | 90 | 85 |  |

What is claimed is:

1. In a catalyst having a high thermal stability, including a solid catalytically active carrier material and a catalytically active metal component consisting essentially of at least one noble metal upon said carrier, the improvement which comprises said catalytically active carrier material consisting essentially of aluminum oxide and having admixed therewith between about 0.5 and 8% by weight of preformed zinc oxide.

2. The catalyst as defined by claim 1, wherein said solid catalyst support comprises a bed of discrete solid particles comprising said catalytically active carrier material.

3. The catalyst as defined in claim 1, wherein said catalytically active metal component comprises about 0.01 and 1% by weight of platinum or palladium.

4. The catalyst as defined in claim 3, wherein said catalytically active metal comprises a mixture of platinum and palladium in a ratio of between about 9:5 to 4:3, respectively.

5. The catalyst as defined in claim 1, wherein said active metal component comprises between about 0.01 and 1.0% of platinum in combination with up to 0.5% ruthenium, said platinum and ruthenium being present in a ratio from about 1:3 to 1:0.15, respectively.

6. The catalyst as defined in claim 1, wherein said catalytically active metal comprises a mixture of platinum, ruthenium, rhodium and rhenium in a ratio of from about 1:1:1:1 to about 1:0.25:0.25:0.25, respectively.

7. The catalyst as defined by claim 1 which comprises a solid catalyst support bearing a layer of the catalytically active carrier material.

8. The catalyst as defined by claim 7, wherein said solid catalyst support comprises a solid reticulated structure of catalytically inert material bearing a layer of the catalytically active carrier material.

9. The catalyst as defined by claim 8, wherein said reticulated structure is a ceramic honey-comb structure.

10. The catalyst as defined by claim 8, wherein said reticulated structure is a metallic honey-comb structure.

11. A process for the preparation of the catalyst defined in claim 7, comprising the steps of mixing together in the presence of water a finely divided precursor of the catalytically active carrier material and an amount of finely divided zinc oxided, sufficient to obtain the catalytically active carrier material containing between about 0.5 and 8% by weight of zinc oxide, forming a layer of said zinc oxide-containing carrier material on a solid catalyst support and depositing thereon a layer of said catalytically active metal component.

12. The process as defined by claim 11, wherein said drying is conducted at a temperature between about 100° and 250° C and said calcining is conducted at a temperature between about 600° and 1200° C.

13. The process as defined by claim 11, wherein said precursor of the catalytically active carrier material is aluminum oxide hydrate.

14. The process as defined by claim 13, wherein said mixture of zinc oxide and aluminum oxide hydrate comprises an aqueous suspension of said components in highly dispersed form, said components having a particle size of about 0.5 to about 5µ, and said step of forming a layer of carrier material on a solid support comprises coating a catalytically inert support with said aqueous suspension.

15. The process as defined in claim 14, wherein the particle size of the dispersed components is between about 1 and about 3µ.

16. The process as defined by claim 11, wherein said step of forming the layer of carrier material on a solid support comprises forming discrete solid particles from said mixture of carrier material and zinc oxide.

17. The process as defined by claim 16, wherein said precursor of the catalytically active carrier material is aluminum oxide.

* * * * *